United States Patent
Khan

(10) Patent No.: US 9,347,397 B2
(45) Date of Patent: May 24, 2016

(54) REFLEX ANNULAR VENT NOZZLE

(75) Inventor: Wasif Khan, Hartford, CT (US)

(73) Assignee: United Technologies Corporation, Hartford, CT (US)

(*) Notice: Subject to any disclaimer, the term of this patent is extended or adjusted under 35 U.S.C. 154(b) by 935 days.

(21) Appl. No.: 13/564,931

(22) Filed: Aug. 2, 2012

(65) Prior Publication Data

US 2014/0037443 A1 Feb. 6, 2014

(51) Int. Cl.
| | | |
|---|---|---|
| *F02K 1/28* | (2006.01) | |
| *F02K 3/075* | (2006.01) | |
| *F02K 1/68* | (2006.01) | |
| *F02K 1/70* | (2006.01) | |
| *F02K 1/72* | (2006.01) | |

(52) U.S. Cl.
CPC . *F02K 1/28* (2013.01); *F02K 3/075* (2013.01); *F05D 2250/323* (2013.01); *F05D 2250/713* (2013.01); *F05D 2260/4031* (2013.01); *F05D 2260/605* (2013.01)

(58) Field of Classification Search
CPC ............ F02K 3/075; F02K 1/68; F02K 1/70; F02K 1/72; F02K 1/28
See application file for complete search history.

(56) References Cited

U.S. PATENT DOCUMENTS

| | | | |
|---|---|---|---|
| 4,493,184 A | 1/1985 | Nikkanen et al. | |
| 4,732,324 A | 3/1988 | Nightingale | |
| 4,805,401 A | 2/1989 | Thayer et al. | |
| 5,729,969 A | 3/1998 | Porte | |
| 7,673,458 B2 * | 3/2010 | Kemper et al. | 60/770 |
| 7,966,827 B2 | 6/2011 | Allethauser | |
| 8,074,440 B2 | 12/2011 | Kohlenberg et al. | |
| 8,136,767 B2 * | 3/2012 | Cueman et al. | 244/208 |
| 8,137,060 B2 | 3/2012 | Winter et al. | |
| 2005/0155341 A1 | 7/2005 | Germain et al. | |
| 2007/0000232 A1 * | 1/2007 | Powell et al. | 60/204 |
| 2007/0245739 A1 | 10/2007 | Stretton et al. | |
| 2009/0094961 A1 | 4/2009 | Stern | |
| 2009/0178416 A1 | 7/2009 | Migliaro et al. | |
| 2010/0008764 A1 | 1/2010 | Baltas et al. | |
| 2010/0024435 A1 | 2/2010 | Vauchel | |
| 2010/0170220 A1 * | 7/2010 | Kohlenberg | 60/226.3 |
| 2010/0186369 A1 | 7/2010 | Crosta et al. | |
| 2011/0146230 A1 | 6/2011 | LaChapelle et al. | |
| 2012/0079804 A1 | 4/2012 | Stuart et al. | |
| 2013/0236294 A1 * | 9/2013 | Vauchel et al. | 415/148 |

FOREIGN PATENT DOCUMENTS

WO WO 2012056138 A1 * 5/2012

OTHER PUBLICATIONS

International Search Report and Written Opinion for International Application No. PCT/US2013/051236 completed on Oct. 24, 2013.
International Preliminary Report on Patentability for International Application No. PCT/US2013/051236 mailed Feb. 12, 2015.
Supplementary European Search Report for European Patent Application No. 13825191.3 mailed Oct. 16, 2015.

* cited by examiner

*Primary Examiner* — Mary A Davis
(74) *Attorney, Agent, or Firm* — Carlson, Gaskey & Olds

(57) ABSTRACT

A gas turbine engine includes a core defining an engine central longitudinal axis. An inner-fixed structure is radially outward of the core. A core cowl extends from the inner-fixed structure to a trailing edge. A thrust reverser is spaced radially outward of the core cowl to define a fan flow path. A vent has a core cowl inner surface formed as part of the core cowl and a vent inner surface that is spaced radially inward of the core cowl inner surface to define a vent flow path. A reflex member extends from a trailing edge of the core nacelle to impede mixing of the fan flow path and the vent flow path.

23 Claims, 3 Drawing Sheets

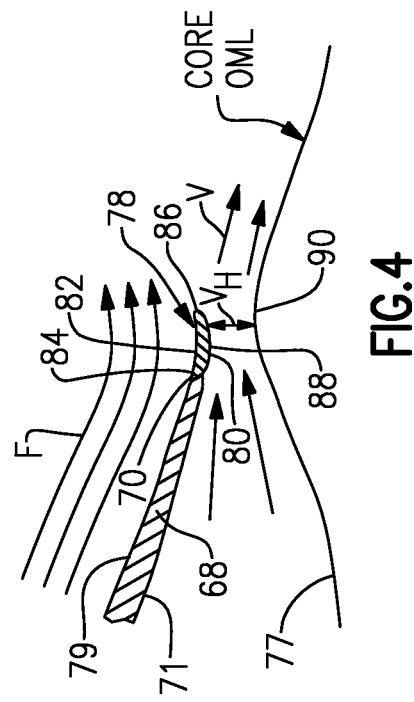
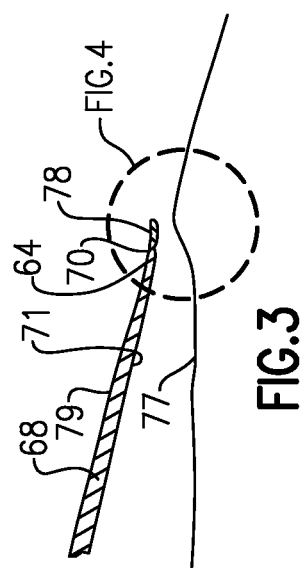
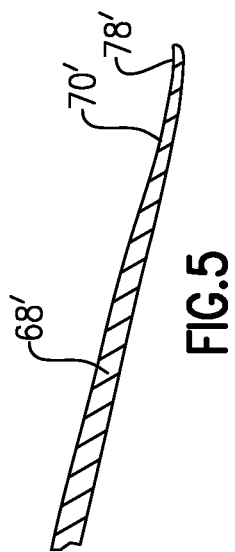

US 9,347,397 B2

REFLEX ANNULAR VENT NOZZLE

BACKGROUND

A gas turbine engine typically includes a vent that is formed by the fan Inner-Fixed Structure (IFS) also known as the core cowl and the core external surface also known as Core Outer Mold line (Core OML). Ideally, the vent would be located in a region where the static pressure is less than the ambient pressure to increase the Vent Nozzle Pressure Ratio (VNPR). Placing a vent in such a location for a geared turbo fan engine configuration is challenging because this type of engine has a low fan nozzle pressure ratio (FNPR). Due to the low fan nozzle pressure ratio there is no over expansion region on a core cowl where the static pressure is less than the ambient pressure. Due to the low VNPR, the fan stream suppresses the vent stream which adversely affects the vent flow coefficient and results in an increase in the physical vent exit area requirement.

Additionally, the geared turbo fan configuration has a smaller turbine diameter, which reduces a circumferential width of the vent. Thus, to meet the vent exit area requirement, the height of the vent step is increased. This increase in height results in an increase in vent step drag as associated with a backward facing step, which adversely affects efficiency.

SUMMARY

In one exemplary embodiment, a nacelle assembly for a gas turbine engine includes a core defining an engine central longitudinal axis. An inner-fixed structure is radially outward of the core and has a core cowl that extends from the inner-fixed structure to a trailing edge. A thrust reverser is spaced radially outward of the inner-fixed structure to define a fan flow path. A vent having a core cowl internal surface is formed as part of the core cowl and a vent inner surface is spaced radially inward of the core cowl internal surface to define a vent flow path. A reflex member extends from the trailing edge to impede mixing of the fan flow path and the vent flow path.

In a further embodiment of the above gas turbine engine, the reflex member comprises an annular strip that is fixed to the trailing edge.

In a further embodiment of any of the above gas turbine engines, the annular strip is comprised of a rigid material.

In a further embodiment of any of the above gas turbine engines, the reflex member comprises a reflex inner surface that faces the vent inner surface and a reflex outer surface that faces opposite the reflex inner surface. The reflex outer surface comprises a concave surface.

In a further embodiment of any of the above gas turbine engines, the reflex member has a curved profile extending from a fore edge of the reflex member to an aft edge of the reflex member.

In a further embodiment of any of the above gas turbine engines, the curved profile has a portion that extends radially inwardly toward the vent inner surface.

In a further embodiment of any of the above gas turbine engines, the vent inner surface has a portion that converges toward the reflex member to define a vent height.

In a further embodiment of any of the above gas turbine engines, the vent height is less than about 0.50 inches (1.27 cm).

In a further embodiment of any of the above gas turbine engines, the vent inner surface has a portion that converges toward the reflex member to define a vent height.

In a further embodiment of any of the above gas turbine engines, the reflex member extends from a fore edge fixed to the trailing edge to an aft edge that defines the vent height. A portion of the reflex member that is between the fore and aft edges extends radially inwardly toward the engine central longitudinal axis.

In a further embodiment of any of the above gas turbine engines, the reflex member is integrally formed as one piece with the core cowl.

In one exemplary embodiment, a gas turbine engine includes a core defining an engine central longitudinal axis. An inner-fixed structure is radially outward of the core. A fan has a thrust reverser unit spaced radially outward of the inner-fixed structure to define a fan flow path. A first shaft is rotatable about the engine central longitudinal axis and connected to the fan. A first compressor and a first turbine section are interconnected by the first shaft. A second shaft is spaced radially outwardly of the first shaft and rotatable about the engine central longitudinal axis. A second compressor and a second turbine section are interconnected by the second shaft. A core cowl extends from the inner-fixed structure to a trailing edge. An inner peripheral surface of a core OML is spaced radially outward of a core nozzle inner surface to define a core flow path. A vent having a core cowl internal surface is formed as part of the core cowl and a vent inner surface is spaced radially inward of the core cowl internal surface to define a vent flow path. A reflex member extends from the trailing edge to impede mixing of the fan flow path and the vent flow path.

In a further embodiment of the above gas turbine engine, the first shaft is connected to the fan through a geared architecture.

In a further embodiment of any of the above gas turbine engines, the reflex member comprises an annular strip that is fixed to extend aft of the trailing edge.

In a further embodiment of any of the above gas turbine engines, the reflex member extends from a fore edge fixed to the trailing edge to an aft edge. The reflex member defines a vent height relative to the vent inner surface.

In a further embodiment of any of the above gas turbine engines, a portion of the reflex member that is between the fore and aft edges extends radially inwardly toward the engine central longitudinal axis.

In a further embodiment of any of the above gas turbine engines, the vent inner surface includes a portion that converges toward the reflex member to define the vent height.

In a further embodiment of any of the above gas turbine engines, the vent height is less than about 0.50 inches (1.27 cm).

In a further embodiment of any of the above gas turbine engines, the reflex member has a curved profile extending from a fore edge of the reflex member to an aft edge of the reflex member. The curved profile has a portion that extends radially inwardly toward the vent inner surface.

In a further embodiment of any of the above gas turbine engines, the reflex member is integrally formed as one piece with the core cowl.

BRIEF DESCRIPTION OF THE DRAWINGS

The disclosure can be further understood by reference to the following detailed description when considered in connection with the accompanying drawings wherein:

FIG. 3 is a schematic cross-sectional view of a core cowl trailing edge with a reflex member.

FIG. 4 is a magnified view of the reflex member of FIG. 3.

FIG. 5 is a schematic cross-sectional view of an integrated core cowl trailing edge and reflex member.

DETAILED DESCRIPTION

Figure 1:
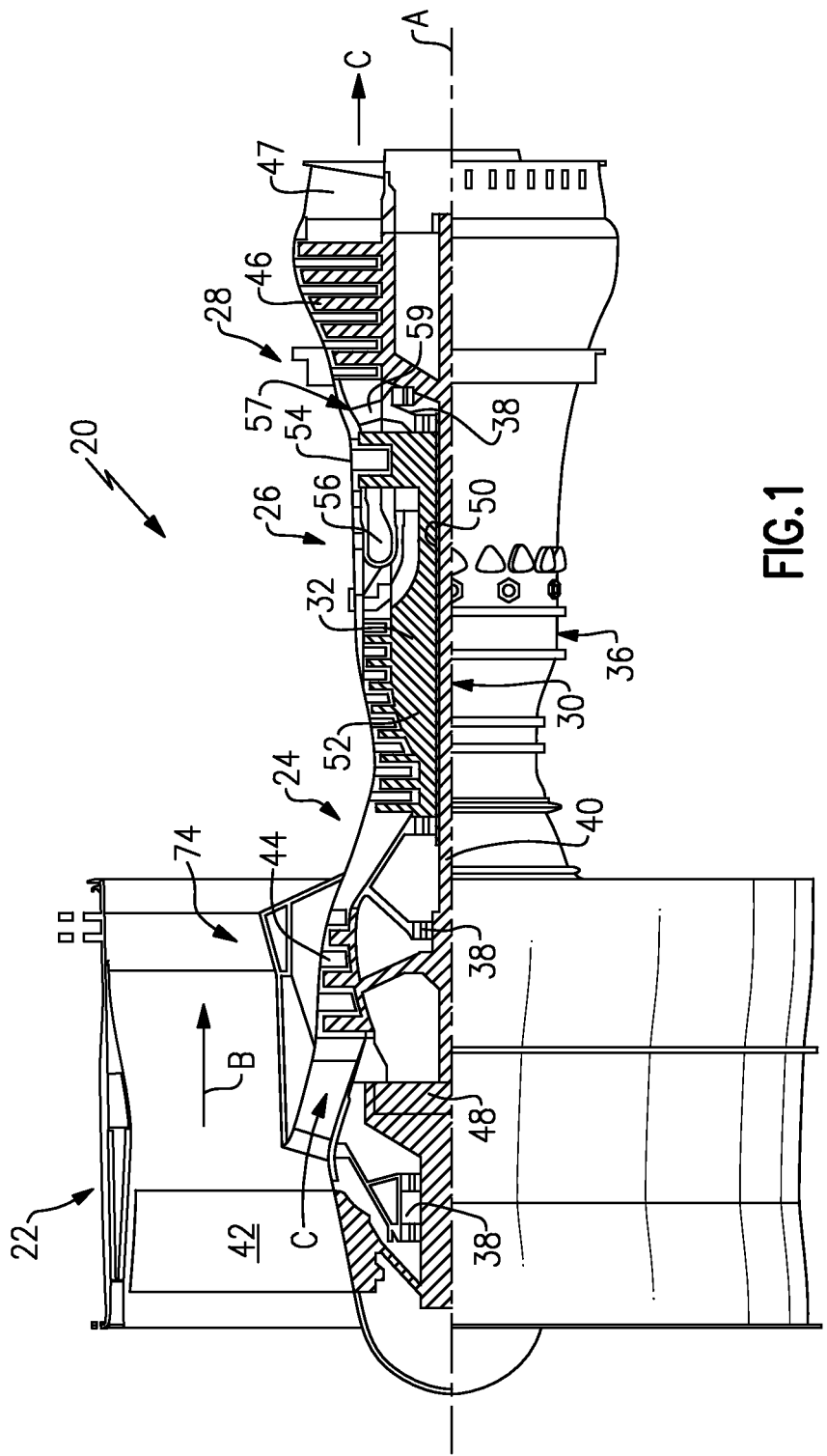
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46, then enters the core nozzle 43. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 2.0. "Low corrected fan tip speed" is the actual fan tip speed in ft/sec divided by an industry standard temperature correction of [(Tambient deg R)/518.7)—^0.5]. The "Low corrected fan tip speed" as disclosed herein according to one non-limiting embodiment is less than about 1150 ft/second.

Figure 2:
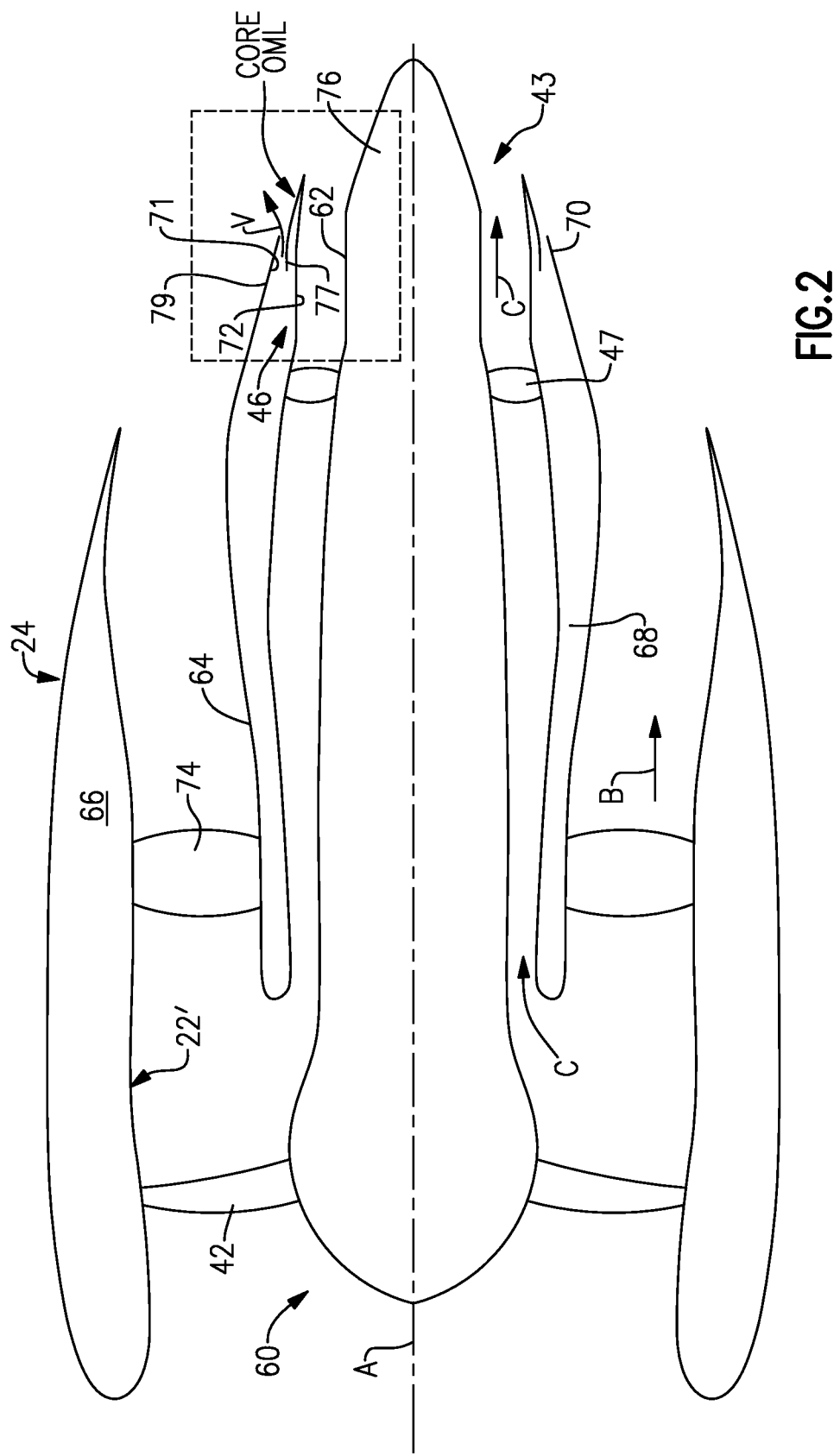
FIG. 2 is a schematic illustration of bypass, vent, and core flow paths through the gas turbine engine of FIG. 1.

Referring to FIGS. 2-4, a flow path through the nacelle is shown in greater detail. The engine includes a spinner 60 that defines the engine central longitudinal axis A. The bypass flow path B is defined by a thrust reverser unit 66 that is spaced radially outward from an Inner-Fixed Structure (IFS) 64. A core cowl 79 comprises an external portion of the IFS 64 which extends to a trailing edge 70. The core flow path C is defined between a core nozzle inner surface 62 and an inner peripheral surface 72 of the core cowl 79. Fan exit guide vanes (FEGV) 74 extend radially from the IFS 64 to the fan case 22' and typically circumscribe the low pressure compressor 44. Turbine exit guide vanes (TEGV) 47 extend radially from the core inner nozzle surface 62 to the inner peripheral surface 72 of the core cowl 79 and define where the core nozzle 43 begins.

The core nozzle inner surface 62 is defined in part by a tailcone 76. The inner peripheral surface 72 of the core cowl 79 is spaced radially outward of the core nozzle inner surface 62 to define the core flow path C through the core nozzle 43.

Vent air flow is extracted from the bypass stream B into a vent plenum 68. Vent flow path V is defined between a vent inner surface 77 and an internal surface 71 of the core cowl 79 that is spaced radially outward of the vent inner surface 77. A core OML comprises an external portion of the vent inner surface 77, which extends to a core trailing edge. A reflex member 78 (FIGS. 3-4) extends from the vent trailing edge 70 to deflect fan flow F away from the vent flow path V (see FIG. 4), which impedes mixing of the fan flow path and the vent flow path.

In one example, the reflex member 78 comprises a separate component that is attached to the core cowl trailing edge 70. However, the reflex member 78 does not necessarily have to be a separate piece and can be integrated in the design as part of the core cowl as shown in FIG. 5. In a retrofitting application the reflex member 78 can be separately attached to the IFS but if part of the original design the reflex member 78' can be manufactured as one piece with the IFS to extend from the trailing edge 70' of the nacelle 68' (FIG. 5).

In one example, the reflex member 78 comprises an annular strip that is fixed to the core cowl trailing edge 70. In one example, the annular strip is comprised of a rigid material; however, the reflex member 78 could be comprised of any type of material that is strong enough to deflect the fan flow away from the vent flow path.

The reflex member 78 includes an inner surface 80 that faces the vent inner surface 77 and an outer surface 82 that faces opposite the inner surface 80. In one example, the outer surface 82 comprises a concave surface that serves as a shield to deflect fan flow away from vent flow.

As shown in FIG. 4, the reflex 78 has a curved profile extending from a fore edge 84 of the reflex member 78 to an aft edge 86 of the reflex member 78. The curved profile has a portion 88 that extends radially inwardly toward the Core external surface (Core OML).

In one example, the vent inner surface 77 is profiled to extend radially outwardly toward the reflex member 78. A portion 90 of the vent inner surface 77 converges toward the reflex member 78 to define a vent height $V_H$. In one example, the reflex member 78 allows the vent height to be reduced to less than about 0.50 inches (1.27 cm).

As discussed above, in previous configurations the vent height was increased to provide sufficient exit area. However, the disadvantage was that as the height increased, vent step drag increased as well. To decrease the step height, the vent flow coefficient has to be improved. The vent flow coefficient is equal to the measured flow (Vm) at the vent location divided by the ideal flow (Vi). To improve the vent flow coefficient, vent flow is shielded by the reflex member 78, which is configured to extend from the trailing edge 70 of the core nacelle 68. The reflex member 78 provides a surface that deflects the fan flow away from the vent without incurring excess pressure loss due to the flow turning.

By using the reflex member 78 to deflect the fan flow in combination with the converging vent inner surface, the local static pressure is dropped which increases the Vent Nozzle Pressure Ratio (VNPR). Due to the increase in VNPR, the vent flow coefficient has improved which allows the vent physical exit area to be reduced. This in turn allows the vent step height to be reduced, which results in a decrease in step drag associated with the backward facing, i.e. aft facing, step. In one example, vent step height was reduced from approximately one inch (2.5 cm) to less than about 0.50 inches (1.27 cm).

Although an example embodiment has been disclosed, a worker of ordinary skill in this art would recognize that certain modifications would come within the scope of the claims. For that reason, the following claims should be studied to determine their true scope and content.

What is claimed is:

1. A nacelle assembly for a gas turbine engine comprising:
   a core defining an engine central longitudinal axis;
   an inner-fixed structure radially outward of the core and having a core cowl that extends from the inner-fixed structure to a trailing edge;
   a thrust reverser spaced radially outward of the inner-fixed structure to define a fan flow path;
   a vent having a core cowl internal surface formed as part of the core cowl and a vent inner surface spaced radially inward of the core cowl internal surface to define a vent flow path; and
   a reflex member extending from the trailing edge to impede mixing of the fan flow path and the vent flow path, wherein the reflex member includes a curved portion that is formed as part of a radially outer surface of the reflex member.

2. The nacelle assembly for the gas turbine engine according to claim 1, wherein the vent inner surface has a portion that converges toward the reflex member to define a vent height.

3. The nacelle assembly for the gas turbine engine according to claim 2, wherein the reflex member extends from a fore edge fixed to the trailing edge to an aft edge that defines the vent height, and wherein a portion of the reflex member that is between the fore and aft edges extends radially inwardly toward the engine central longitudinal axis.

4. The nacelle assembly for the gas turbine engine according to claim 1, wherein vent air flow is extracted from the fan flow path into a vent plenum within the inner-fixed structure.

5. The nacelle assembly for the gas turbine engine according to claim 4, wherein a core inner nozzle surface is spaced radially inwardly of an inner peripheral surface of the core cowl to define a portion of a core flow path that is radially inward of the vent air flow.

6. The nacelle assembly for the gas turbine engine according to claim 1, wherein the radially outer surface includes a concave surface portion.

7. A nacelle assembly for the gas turbine engine comprising:
   a core defining an engine central longitudinal axis;
   an inner-fixed structure radially outward of the core and having a core cowl that extends from the inner-fixed structure to a trailing edge;
   a thrust reverser spaced radially outward of the inner-fixed structure to define a fan flow path;
   a vent having a core cowl internal surface formed as part of the core cowl and a vent inner surface spaced radially inward of the core cowl internal surface to define a vent flow path; and
   a reflex member extending from the trailing edge to impede mixing of the fan flow path and the vent flow path, wherein the reflex member includes a curved portion, and wherein the reflex member comprises an annular strip that is fixed to the trailing edge.

8. The nacelle assembly for the gas turbine engine according to claim 7, wherein the annular strip is comprised of a rigid material.

9. A nacelle assembly for a gas turbine engine comprising:
   a core defining an engine central longitudinal axis;
   an inner-fixed structure radially outward of the core and having a core cowl that extends from the inner-fixed structure to a trailing edge;
   a thrust reverser spaced radially outward of the inner-fixed structure to define a fan flow path;
   a vent having a core cowl internal surface formed as part of the core cowl and a vent inner surface spaced radially inward of the core cowl internal surface to define a vent flow path; and
   a reflex member extending from the trailing edge to impede mixing of the fan flow path and the vent flow path, and wherein the reflex member comprises a reflex inner surface that faces the vent inner surface and a reflex outer surface that faces opposite the reflex inner surface, and wherein the reflex outer surface comprises a concave surface.

10. A nacelle assembly for the gas turbine engine comprising:
    a core defining an engine central longitudinal axis;
    an inner-fixed structure radially outward of the core and having a core cowl that extends from the inner-fixed structure to a trailing edge;
    a thrust reverser spaced radially outward of the inner-fixed structure to define a fan flow path;

a vent having a core cowl internal surface formed as part of the core cowl and a vent inner surface spaced radially inward of the core cowl internal surface to define a vent flow path; and a reflex member extending from the trailing edge to impede mixing of the fan flow path and the vent flow path, wherein the reflex member includes a curved portion, and wherein the reflex member has a curved profile extending from a fore edge of the reflex member to an aft edge of the reflex member.

11. The nacelle assembly for the gas turbine engine according to claim 10, wherein the curved profile includes the curved portion that extends radially inwardly toward the vent inner surface.

12. The nacelle assembly for the gas turbine engine according to claim 11, wherein the vent inner surface has a portion that converges toward the reflex member to define a vent height.

13. The nacelle assembly for the gas turbine engine according to claim 12, wherein the vent height is less than about 0.50 inches (1.27 cm).

14. A nacelle assembly for the gas turbine engine comprising:
a core defining an engine central longitudinal axis;
an inner-fixed structure radially outward of the core and having a core cowl that extends from the inner-fixed structure to a trailing edge;
a thrust reverser spaced radially outward of the inner-fixed structure to define a fan flow path;
a vent having a core cowl internal surface formed as part of the core cowl and a vent inner surface spaced radially inward of the core cowl internal surface to define a vent flow path; and
a reflex member extending from the trailing edge to impede mixing of the fan flow path and the vent flow path, wherein the reflex member includes a curved portion, and wherein the vent inner surface has a portion that converges toward the reflex member to define a vent height, and, wherein the reflex member extends from a fore edge fixed to the trailing edge to an aft edge that defines the vent height, and wherein a portion of the reflex member that is between the fore and aft edges extends radially inwardly toward the engine central longitudinal axis, and wherein the reflex member is integrally formed as one piece with the core cowl.

15. A gas turbine engine comprising:
a core defining an engine central longitudinal axis;
an inner-fixed structure radially outward of the core;
a fan having a thrust reverser unit spaced radially outward of the inner-fixed structure to define a fan flow path;
a first shaft rotatable about the engine central longitudinal axis and connected to the fan;
a first compressor and a first turbine section interconnected by the first shaft;
a second shaft spaced radially outwardly of the first shaft and rotatable about the engine central longitudinal axis;
a second compressor and a second turbine section interconnected by the second shaft;
a core cowl that extends from the inner-fixed structure to a trailing edge, an inner peripheral surface of a core OML being spaced radially outward of a core nozzle inner surface to define a core flow path;
a vent having a core cowl internal surface formed as part of the core cowl and a vent inner surface spaced radially inward of the core cowl internal surface to define a vent flow path; and
a reflex member extending from the trailing edge to impede mixing of the fan flow path and the vent flow path, and wherein the reflex member has a curved profile extending from a fore edge of the reflex member to an aft edge of the reflex member, and wherein the curved profile has a portion that extends radially inwardly toward the vent inner surface.

16. The gas turbine engine according to claim 15, wherein the first shaft is connected to the fan through a geared architecture.

17. The gas turbine engine according to claim 15, wherein the reflex member is integrally formed as one piece with the core cowl.

18. A gas turbine engine comprising:
a core defining an engine central longitudinal axis;
an inner-fixed structure radially outward of the core;
a fan having a thrust reverser unit spaced radially outward of the inner-fixed structure to define a fan flow path;
a first shaft rotatable about the engine central longitudinal axis and connected to the fan through a geared architecture;
a first compressor and a first turbine section interconnected by the first shaft;
a second shaft spaced radially outwardly of the first shaft and rotatable about the engine central longitudinal axis;
a second compressor and a second turbine section interconnected by the second shaft;
a core cowl that extends from the inner-fixed structure to a trailing edge, an inner peripheral surface of a core OML being spaced radially outward of a core nozzle inner surface to define a core flow path;
a vent having a core cowl internal surface formed as part of the core cowl and a vent inner surface spaced radially inward of the core cowl internal surface to define a vent flow path; and
a reflex member extending from the trailing edge to impede mixing of the fan flow path and the vent flow path, and wherein the reflex member comprises an annular strip that is fixed to extend aft of the trailing edge.

19. The gas turbine engine according to claim 18, wherein the reflex member extends from a fore edge fixed to the trailing edge en an aft edge, and wherein the reflex member defines a vent height relative to the vent inner surface.

20. The gas turbine engine according to claim 19, wherein a portion of the reflex member that is between the fore and aft edges extends radially inwardly toward the engine central longitudinal axis.

21. The gas turbine engine according to claim 20, wherein the vent inner surface includes a portion that converges toward the reflex member to define the vent height.

22. The gas turbine engine according to claim 21, wherein the vent height is less than about 0.50 inches (1.27 cm).

23. A nacelle assembly for the gas turbine engine comprising:
a core defining an engine central longitudinal axis;
an inner-fixed structure radially outward of the core and having a core cowl that extends from the inner-fixed structure to a trailing edge;
a thrust reverser spaced radially outward of the inner-fixed structure to define a fan flow path;
a vent having a core cowl internal surface formed as part of the core cowl and a vent inner surface spaced radially inward of the core cowl internal surface to define a vent flow path; and
a reflex member extending from the trailing edge to impede mixing of the fan flow path and the vent flow path, wherein the reflex member includes a curved portion, and wherein an aft edge of the reflex member extends in a direction away from the engine central longitudinal axis.

* * * * *